United States Patent [19]

Holt

[11] 4,249,518

[45] Feb. 10, 1981

[54] METHOD FOR MAINTAINING A CORRECT DENSITY GRADIENT IN A NON-CONVECTING SOLAR POND

[76] Inventor: Rush D. Holt, 5440 Mosholu Ave., Riverdale, N.Y. 10471

[21] Appl. No.: 86,769

[22] Filed: Oct. 22, 1979

[51] Int. Cl.³ .............................................. F23J 3/02
[52] U.S. Cl. .................................. 126/415; 126/419; 126/452
[58] Field of Search ............... 126/415, 416, 417, 452; 60/641; 202/234; 203/10, 100, DIG. 1

[56] References Cited

U.S. PATENT DOCUMENTS

| | | | |
|---|---|---|---|
| 681,407 | 7/1901 | Coward | 203/DIG. 1 |
| 2,843,536 | 7/1958 | Mount | 202/234 |
| 3,372,691 | 3/1968 | Shachar | 126/452 |
| 4,017,028 | 4/1977 | Manor | 126/419 |

OTHER PUBLICATIONS

"Solar Ponds as Heat Source for Low-Temperature Multi-Effect Distillation", Tabor, *Desalination*, vol. 17, p. 289(1975).
"Large Area Solar Collectors for Power Production", Tabor, *Solar Energy*, vol. 7, p. 189 (1963).
"The Physics of the Solar Pond", Weinberger, *Solar Energy*, vol. 8, p. 45 (1964).
"A Salt Gradient Solar Pond", Zangrando, Bryant, *Solar Age*, vol. 3, p. 21 (1978).
"Solar Pond Project", Tabor, Matz, *Solar Energy*, vol. 9, p. 177 (1965).
"Solar Pond Stability Experiments", Leshuk et al., Solar Energy, vol. 21, No. 3, 1978.

*Primary Examiner*—Samuel Scott
*Assistant Examiner*—Lee E. Barrett
*Attorney, Agent, or Firm*—Bachman and LaPointe

[57] ABSTRACT

The present invention resides in a method and apparatus for maintaining a substantially constant salt density gradient in a non-convecting salt gradient pond. The apparatus for carrying out the method of the present invention enables one to maintain a substantially constant salt density gradient automatically in a highly efficient, simple and economic manner.

12 Claims, 5 Drawing Figures

METHOD FOR MAINTAINING A CORRECT DENSITY GRADIENT IN A NON-CONVECTING SOLAR POND

BACKGROUND OF THE INVENTION

The present invention resides in a falling pond method for maintaining a salt density gradient in a non-convecting salt gradient pond, i.e., falling solar pond, and means for carrying out said method.

A non-convecting solar pond is an efficient and relatively inexpensive energy collection and storage system. The design of a solar pond is such that it takes advantage of several important properties of water, namely, high heat capacity, transparency to visible and ultraviolet light, opacity to infrared radiation and poor heat conductivity.

The general principles involved in designing a solar pond are relatively simple. A body of water collects large amounts of heat from the sun. Ordinarily the water temperature remains close to the ambient air temperature because the heating of the water produces a convection circulation which brings the absorbed heat to the surface where it is dissipated into the air, largely by evaporation. It has been found that by establishing a salt density gradient which increases with depth, convection circulation can be inhibited thereby greatly reducing loss of heat at the surface of the pond.

For most ordinary uses, such as space heating or industrial process heating, a solar pond should be between two and three meters deep and at least a few hundred square meters in size. The top layer of the pond has little or no salt dissolved therein and the concentration of salt increases with depth until a density gradient layer is established which is between one and one and a half meters deep. Below this gradient region is the heat storage region which is generally of constant density equal to the density of the lowermost region of the salt gradient region. The storage region may be in direct contact with the gradient region or separated therefrom by means of transparent membrane such as plastic or the like in which case the storage region could be salt free. The choice between a direct contact or a separate storage region depends on the relative cost of the salt and plastic. In either case, convection is permitted and in fact is desirable in the heat storage region.

While salt gradient solar ponds are the most cost effective solar thermal system and can provide useful heat at a cost that is less than most conventional methods, the concept has remained largely undeveloped. The principal reason for this lack of development resides in the problems encountered in attempting to maintain the salt density gradient which, if left alone, tends to diffuse away leaving a pond of uniform salinity thereby resulting in convection circulation and a corresponding loss of heat.

Heretofore, one method used to maintain the salt gradient has been simply to add salt to the bottom layers of the pond while flushing the top layers of brine away with fresh water. This method, while simple, suffers from a number of disadvantages the most important of which are added cost for the additional salt and lack of automatic means for determining when salt must be added. While the movement of salt upward from the bottom layers is rather slow, on the order of 0.3 mm per day, a large amount of salt, about 18,000 kg per year, is still needed in order to maintain the proper density gradient in a quarter acre pond. The added expense for the salt coupled with the need for a continual personal surveillance in order to predict when salt must be added has prohibited this method for becoming commercially feasible.

A second method previously employed to maintain the salt gradient in a solar pond comprises removing the top layer of water from the pond which has become salty due to diffusion and transporting it to a holding evaporation pond where the water is allowed to evaporate after which the more concentrated salt solution is returned to the bottom layer of the pond. While this method overcomes the disadvantage of requiring extra salt to maintain the gradient, it requires a large amount of space for the evaporation pond and still requires constant surveillance on the part of personnel in order to determine when the salt water must be removed and returned.

A third method which has been suggested by Dr. Harry Tabor uses a flash evaporator to perform the same function as the evaporation pond discussed above. This particular method has been untried to date due to the considerable expense of the flash evaporator and the complicated system required to employ same. Again, as with the previously discussed methods constant surveillance is required to determine when salt should be added. In addition to the foregoing drawbacks, all of the above-noted methods correct the salt gradient only after a significant amount of salt has reached the surface, i.e. when the salinity gradient has already decayed substantially thereby increasing the likelihood of convection.

Naturally, it would be highly desirable to provide a method for maintaining a substantially constant salt gradient in a solar pond which eliminates the extra cost of adding additional salt and at the same time automatically controls the salt gradient thereby eliminating any convective heat loss.

Accordingly, it is the principal object of the present invention to provide a method for maintaining a substantially constant salt density gradient in a non-convecting solar pond.

It is a further object of the present invention to provide a method as outlined above which is fully automatic.

It is a still further object of the present invention to provide a method as outlined above which is of simple and inexpensive construction.

Further objects and advantages of the present invention will appear hereinbelow.

SUMMARY OF THE INVENTION

In accordance with the present invention it has now been found that the foregoing objects and advantages may be readily achieved.

The present invention resides in a method and apparatus for maintaining a substantially constant salt density gradient in a falling non-convecting salt gradient pond. The apparatus for carrying out the method of the present invention enables one to maintain a substantially constant salt density gradient automatically in a highly efficient, simple and economic manner.

In accordance with the present invention, a solar pond is provided with a spillway which acts as an evaporator. Pumps are automatically actuated in response to various predetermined conditions for feeding salty water to the spillway where the water trickles down the spillway toward a catch basin where it is collected. The exposure of the salt water to the sun and air results in evaporation of the water as it progresses toward the catch basin. The concentrated brine received in the catch basin is then pumped back into the pond preferably at the base of the salt density gradient region, that is, at the interface of gradient region and the heat storage region of the solar pond. Automatic means are provided for adding fresh water to the top of the pond to replace that water lost as a result of the evaporation process.

Thus, is can be seen that the method and apparatus of the present invention provides a simple, inexpensive and automatic arrangement for maintaining a substantially constant salt density gradient in a non-convecting salt gradient pond. By employing the method and apparatus of the present invention disadvantages associated with prior art solar ponds are overcome thereby increasing the commercial feasibility of solar ponds as an energy source.

DETAILED DESCRIPTION

Figure 1:
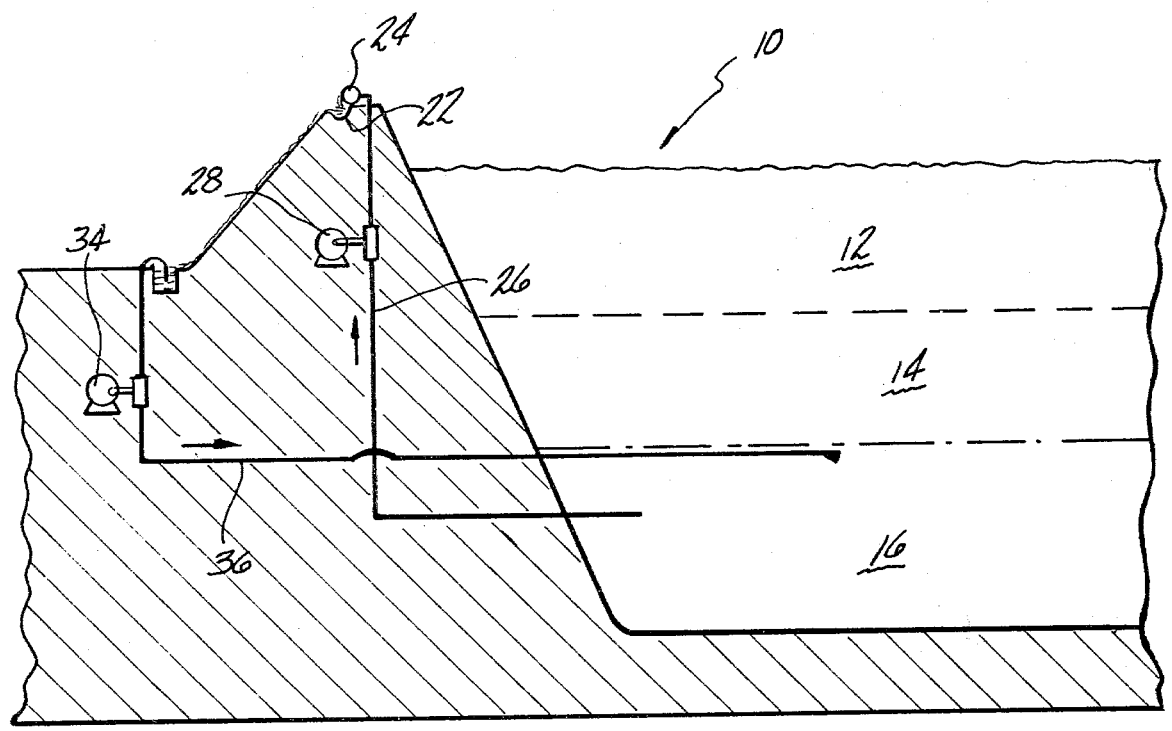
FIGS. 1 and 2 show a schematic illustration of a salt gradient pond employing the method and apparatus of the present invention.

Referring to FIG. 1, a solar pond 10 is illustrated which is constructed by excavating a pit and employing the removed dirt to form raised banks around the pond proper. The pit is lined with plastic and is filled with water, and a salt density gradient is thereafter established. The top region 12 of the pond is substantially salt free. The salt density gradient 14 is established beneath the fresh water region 12. As noted previously the density in region 14 increases with the depth of the pond. The heat storage region 16 is located beneath the gradient region 14 and may be, as noted earlier, either in direct contact with or separated from the gradient region by a transparent membrane. For purposes of illustration and for describing the method of the present invention the salt gradient region is shown in direct contact with the heat storage region. If the heat storage region is in direct contact with the gradient region, the concentration of the heat storage region should be approximately equal to the density of salt at the bottom of the salt gradient region. If on the other hand the regions are separated by a membrane, the storage region may be salt free water. On at least one of the raised banks, preferably the bank having southern exposure, the trickle evaporator 18 of the present invention is constructed.

Figure 2:
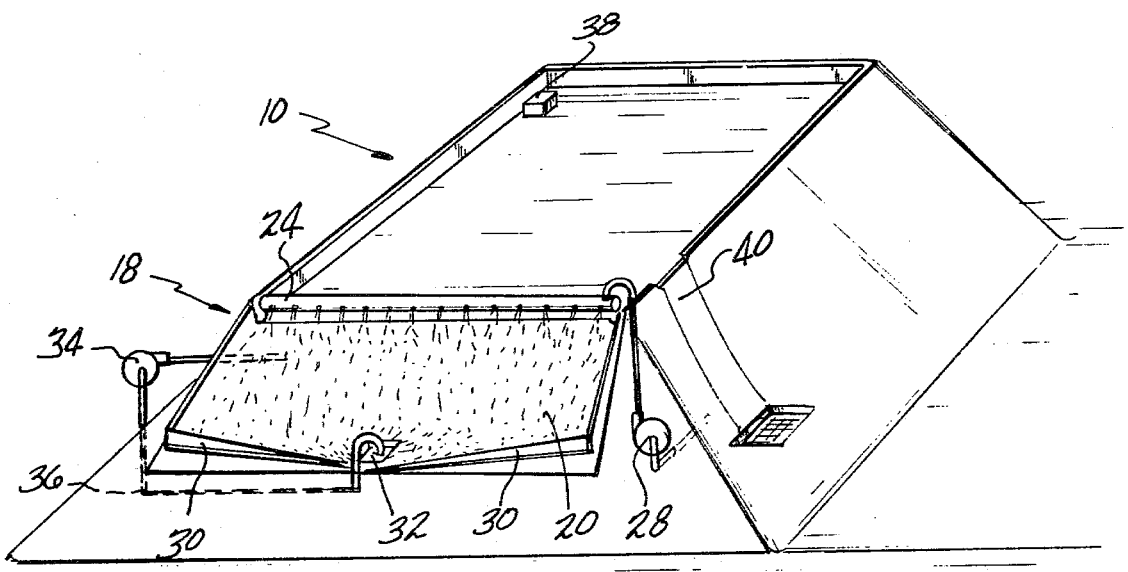

In accordance with the present invention, as can best be seen in FIGS. 1 and 2, the trickle evaporator 18 comprises a sloped graded spillway 20 which is sloped at an angle equal to the geographic latitude plus or minus up to 15°. The slope is covered with any material which will withstand exposure to heat, brine and oxygen and at the same time allow for substantially evan flow of the salt water down the spillway. A preferred material for covering spillway 20 would be plastic sheeting, preferably plastic sheeting which is dark in color so as to maximize the effort of the sun in promoting evaporation. Other suitable covering materials include masonry and metal products.

At the top of the spillway 20 is a trough 22 which receives the brine from a water distributing perforated pipe 24 which is in fluid communication with the heat storage region 16 in the case of direct contact or with the bottom of salt gradient region 14 in the case of separated regions by means of fluid line 26. A fluid pump 28 is provided in fluid line 26 for removing the brine from the heat storage region 16 or bottom of salt gradient region 14 and delivering same to the distributing perforated pipe 24 where the water is distributed over the length of the spillway 20. The fluid pump 28 is responsive to and actuated by a pump drive motor which senses environmental conditions and actuates the fluid pump upon sensing certain predetermined values of the monitored environmental conditions. In accordance with a preferred embodiment of the present invention, pump 28 is responsive to either ambient temperature or the degree of sunlight or both. The values of the light intensity, I, and ambient temperature, T, which activate fluid pump 28 are selected so that the pump 28 is activated at a time when evaporation would be efficiently carried out. Thus, if the ambient temperature (T) is too low and/or the amount of sunshine (I) too little, the pump system will not be activated. The system will be activated in two cases, i.e., where $I > I_o$ and $T > T_{min}$ or when $I > I_{min}$ and $T > T_o$ where $I_o > I_{min}$. The particular sensing means employed may be selected from any of a number of commercial sensing means which are readily available such as thermostats, light sensitive eyes, etc., and the detailed structure of said sensing means forms no part of the instant invention. Alternatively, one could sense the relative humidity rather than temperature and light intensity to activate the control sequences. This could be done by employing dry and wet bulb sensing devices in conjunction with a microprocessor to compute relative humidity.

As noted above, the brine delivered to pipe 24 by pump 28 is distributed over the entire length of the spillway 20 and trickles down the spillway where a substantial amount of evaporation of water takes place. A receiving trough 30 is provided at the bottom of the spillway to collect the concentrated brine. The trough has sloping side walls which feed the collected brine to a catch basin 32 where the brine, under appropriate conditions, is fed by pump 34 to one or more locations in the pond below the gradient region 14, preferably just below the interface between regions 14 and 16 in a direct contact pond or at the bottom of region 14 in a separated region pond, via feed line 36. It is preferred that pump 34 be activated automatically upon actuation of fluid pump 28. In addition, pump 34 is preferably provided with an automatic override control which prohibits pump operation upon sensing that the catch basin 32 is empty so as to prohibit damage to the pump 34. It is a critical feature of the present invention that the catch basin 32 be small in size so that it does not collect a substantial amount of fresh rain water which would tend to dilute the brine. Preferably, the catch basin is sized so that excess rain water will overflow and run away from the pond. It should be appreciated that, depending on the size of the pond, a plurality of feed lines and pumps may be employed for removing brine and returning concentrated brine to the regions of the solar pond so as to maintain a homogeneous concentration.

As water is lost through the evaporation process, the height of the solar pond falls. In accordance with the falling pond method, fresh water is automatically added to the top region 12 of pond 10 by means of pump 38 which is responsive to the level of water in the pond 10. Pump 38 may be controlled by float means, electrodes, or any other suitable means. As the water level in the pond decreases pump 38 is activated to reestablish the water level. It can be seen that the continual addition of fresh water to the top of region 12 of solar pond 10 in combination with the lowering of the gradient region 14 due to the extraction of heated brine from the region 16 results in the maintenance of a tri-layered pond whereby the salt gradient density is controlled and maintained by recirculating the collected brine to the interface between the heat region 16 and the bottom of the gradient region 14 in the case of direct contact regions or to the bottom of gradient region 14 in the case of separated gradient regions. The pond is provided with an overflow lip 40 for removing excess water from the pond which may occur due to excessive rainfall.

Figure 3A:
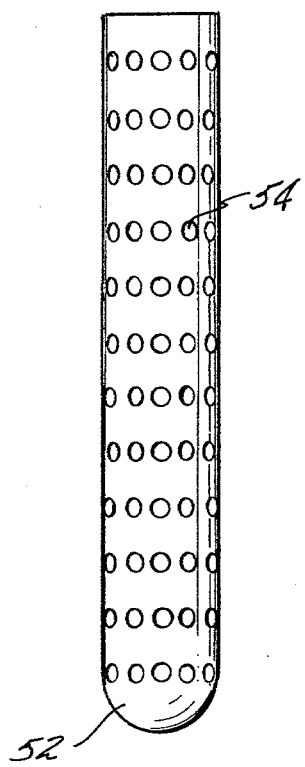
FIGS. 3A, 3B and 3C illustrate a hydrometer employed in the method of the present invention.
Figure 3B:
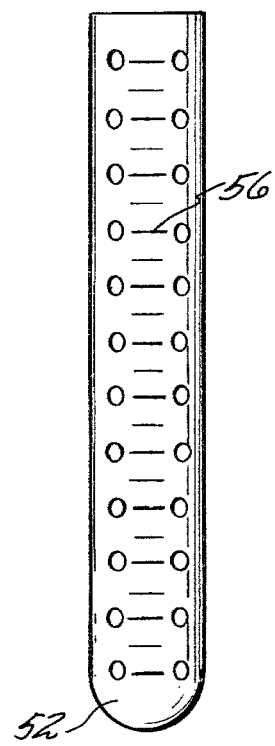
Figure 3C:
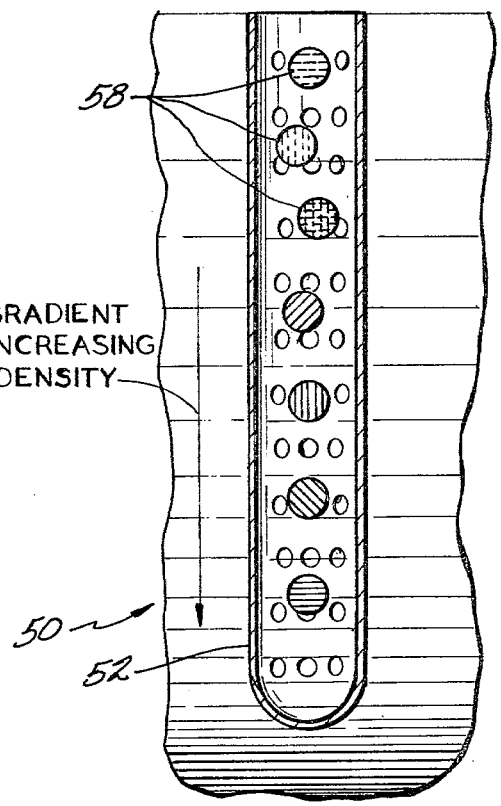

In accordance with the present invention a hydrometer is employed to monitor the density gradient of the solar pond to assure that the evaporation system of the present invention is operating properly. It is highly desirable that the hydrometer be observed without the necessity of removing it from the pond or of removing water samples from the pond as the act of extracting is likely to stir the water and thereby affect the density gradient. In a preferred embodiment as illustrated in FIGS. 3A–C the hydrometer 50 consists of a transparent cylinder 52 made of glass, plastic or the like which is provided with a plurality of perforations 54 over the entire surface thereof which allows the water in the gradient region to readily pass into the interior of the cylinder 52. A graduated scale 56 is ruled on cylinder 52. It should be appreciated that the length of the hydrometer 50 should be sufficient to monitor the entire depth of the gradient region. The interior of cylinder 52 is filled with a plurality of differently colored floating objects 58 such as spheres. Each of the objects has a different specific gravity chosen so that the order and vertical separation form an easily recognizable pattern which may be seen from the surface of the pond and compared to a key to determine if the gradient is correct. The color coding allows the observer to determine whether the objects 58 are floating in the correct order and thus determine if there are any reversed density levels. The separation between the objects 58 indicates the density gradient. Thus, the hydrometer 50 of the present invention differs from known hydrometers in that it shows not only the specific gravity at any location but also the relative density gradient. The specific size of the floating objects 58 is critical. Naturally, the objects must be large enough so as to be readily observed from the surface of the pond. Likewise, it is critical that the objects be small enough to be affected by small scale density variations. Furthermore, the size of the objects should be such that they can readily pass over each other in the cylinder 52 in the event of any reversed density levels. In the case of spheres, it has been found that a diameter of from 0.25 cm to 2.00 cm is useful.

Alternatively, the hydrometer may be replaced by an immersed array of electrodes which would measure the electrical conductivity of the salt solution and thereby the gradient concentration.

It should be appreciated that the system of the present invention may be used in conjunction with a concentrating solar collector such as parabolic mirrors or evaporators having external heat sources in the event of extended cold or cloudy periods. This supplemental system would fit into the pump system in parallel with the trickle evaporator and generally would be used sparingly if at all.

It is difficult to predict the exact water evaporation rate for a certain location and time because the rate depends on a combination of factors, including water temperature, air temperature, relative humidity, wind speed, and insolation energy. The following calculations will show, however, that the designed system of the present invention will concentrate the brine sufficiently for reasonable evaporator areas and flow rates. In the system of the present invention the pump controls are set to provide the correct flow rate for the particular characteristics of the solar pond.

The exact upward salt transport rate depends on various factors such as the overall temperature gradient and concentration gradient in the pond. Measurements taken in existing solar ponds show an average transport rate of about 0.06 kg/m²/day for a typical pond (see for example, Carl E. Nielsen "Control of Gradient Zone Boundaries" in International Solar Energy Society Annual Meeting Proceedings, Atlanta, May, 1979). To maintain a 20% salt solution in the storage region, it is necessary to remove 5 times that much fresh water from the convecting storage region. In other words, the pond must fall 0.30 mm/day. Thus, one must evaporate about 100 kg/m²/year (0.08 gal/day). For example, in an 850 m² pond in the middle Atlantic states, if one were to correct for the upward motion of the salt by adding new salt to the bottom and flushing the top with fresh water, as is the case with known prior art, one would need to add approximately 20.0 tons of salt. If on the other hand, one were to use the system of the present invention, it would be necessary to evaporate about 68 gallons of water per day by means of the trickle evaporator. For standing water with a free surface (such as a lake) the rate of evaporation is given by the empirical formula (found in a number of sources; for example, J. T. Czarnecki, *Swimming Pool Heating*—TR19, Highett, Victoria, Australia 1978).

$$M_{evap} = (7.2 \times 10^{-3})(3.1 + 4.1V)(P_w - P_a)$$

M = evaporated water in (grams/M²)/second

V = wind velocity in meters/second $P_w$ = vapor pressure of water at temperature $T_w$ in kilopascals (kPa)

$P_a$ = partial water vapor pressure of air at $T_a$ and relative humidity RH $P_a = P_{saturated} \times RH \div 100$ (kilopascals)

For solar pond trickle evaporation assume $T_w = 52°$ C.

$P_w = 100$ mm Hg = 13.60 kPa $T_a = 16°$ C.; RH = 60%

$P_a = 8.0$ mm Hg = 1.10 kPa

V = 2 m/second $M_{evap} = 1$ gram/meter²/second = 0.95 gal/hr./m²

To evaporate 68 gallons one needs 70.0 (m²) (hours) of exposure, or in other words 30 m² of surface of water at that temperature exposed for 2.3 hours or an equivalent combination of surface area and exposure time, such that Area×Time = 70 m² hr. This estimate of evaporation rate is based only on stagnant air contact. However, because the water is flowing down the spillway in the present invention evaporation is enhanced somewhat. Solar insolation (which is generally greater than 300 cal/cm$^2$/day on an annual average in central latitudes) will increase this evaporation rate by about 30%. Furthermore, higher water temperature, higher wind velocity, or lower relative humidity, all of which are not unlikely for a typical pond, will give faster evaporation rates. The flow rate necessary to accomplish the evaporation of 68 gallons per day would be at least 300 gallons per day and usually about 600 gallons per day, flowing across the trickle evaporator, i.e. a few gallons per minute.

The principle disadvantage with the system of the present invention is that the evaporation process drains heat from the pond, but the amount of heat removed is tolerable. Furthermore, the heat loss is somewhat mitigated by the fact the pond is more stable as well as more efficient when kept at a lower temperature. In spite of the heat loss this system is economically preferable to known alternatives.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for automatically controlling the salt gradient region in a non-convecting salt gradient pond comprising the steps of:
    A. providing a solar pond having an upper fresh water region, an intermediate salt gradient region and a lower heat storage region;
    B. automatically removing salty water from a first level of said lower heat storage region of said solar pond in response to a sensed ambient condition;
    C. feeding said removed salty water to a spillway where said water is exposed to sun and air;
    D. evaporating said saltly water by said sun and air on said spillway so as to form a concentrated brine;
    E. collecting said concentrated brine from said spillway; and
    F. automatically returning said collected concentrated brine to a second level of said solar pond above said first level.

2. A method according to claim 1 including the steps of automatically feeding fresh water to the top of said fresh water region so as to replace to evaporated water and thereby maintain the height of said solar pond substantially constant.

3. A method according to claim 1 wherein said salty water is automatically removed from said solar pond in response to light intensity.

4. A method according to claim 1 wherein said salty water is automatically removed from said solar pond in response to ambient temperature.

5. A method according to claim 1 wherein said salty water is automatically removed from said solar pond in response to light intensity and ambient temperature.

6. A method according to claim 1 wherein said heat storage region is in direct contact with said salt gradient region and has a salt density substantially equal to the salt density of the lowermost portion of said salt gradient region.

7. A method according to claim 1 including the step of separating said heat storage region from said salt gradient region.

8. An apparatus for automatically controlling the salt density gradient in a non-convecting salt gradient pond comprising an evaporation spillway, first pump means in fluid communication with said salt gradient pond at a first level thereof, means for sensing an ambient condition so as to activate said first pump means for automatically feeding salt water from said pond to said spillway, a catch basin downstream of said spillway for collecting concentrated brine and second pump means in fluid communication with said catch basin and said salt gradient pond at a second level thereof above said first level for automatically returning said brine to said pond.

9. An apparatus according to claim 8 wherein said spillway comprises a sloped graded bank sloped at an angle equal to the geographic latitude plus or minus up to 15°.

10. An apparatus according to claim 9 including sensing means for sensing the ambient temperature for activating said first pump upon sensing a sufficiently high temperature.

11. An apparatus according to claim 9 including sensing means for sensing the light intensity for activating said first pump means upon sensing a sufficiently high light intensity.

12. An apparatus according to claim 9 including sensing means for sensing the ambient temperature and light intensity for activating said first pump means upon sensing a sufficiently high temperature and/or light intensity.

* * * * *